United States Patent [19]

Hapke

[11] 4,030,687
[45] June 21, 1977

[54] ARTICULATED NOZZLE FOR UPPER SURFACE BLOWN AIRCRAFT

[75] Inventor: Donald William Hapke, Issaquah, Wash.

[73] Assignee: The Boeing Company, Seattle, Wash.

[22] Filed: Feb. 23, 1976

[21] Appl. No.: 660,564

[52] U.S. Cl. .......................... 244/12.5; 239/265.19; 239/265.33; 60/230; 244/110 B
[51] Int. Cl.² ........................................ B64C 15/08
[58] Field of Search ............ 244/12 R, 12 D, 23 R, 244/23 D, 52, 110 B; 239/265.29, 265.31, 265.33, 265.19, 265.17, 265.37, 265.39; 60/230, 231

[56] References Cited
UNITED STATES PATENTS 3,612,106  10/1971  Camboulives et al. ....... 239/265.33
3,874,620  4/1975  Kahler et al. ..................... 244/12 D

*Primary Examiner*—Trygve M. Blix
*Assistant Examiner*—Galen L. Barefoot
*Attorney, Agent, or Firm*—J. Peter Mohn; Kenneth W. Thomas

[57] ABSTRACT

An exhaust nozzle used in conjunction with an upper surface blown aircraft for directing the exhaust gases from the aircraft engine over the wing and flap surfaces of the aircraft. The nozzle can occupy two positions. The first position, for use in cruise mode, directs the exhaust gases rearwardly in a normal manner. In the second position, used for takeoff and landing, the nozzle outlet area is slightly increased and the nozzle tilted to direct the exhaust gases rearwardly and downwardly across the wing and flap surfaces thereby increasing lift due to the Coanda effect.

2 Claims, 13 Drawing Figures

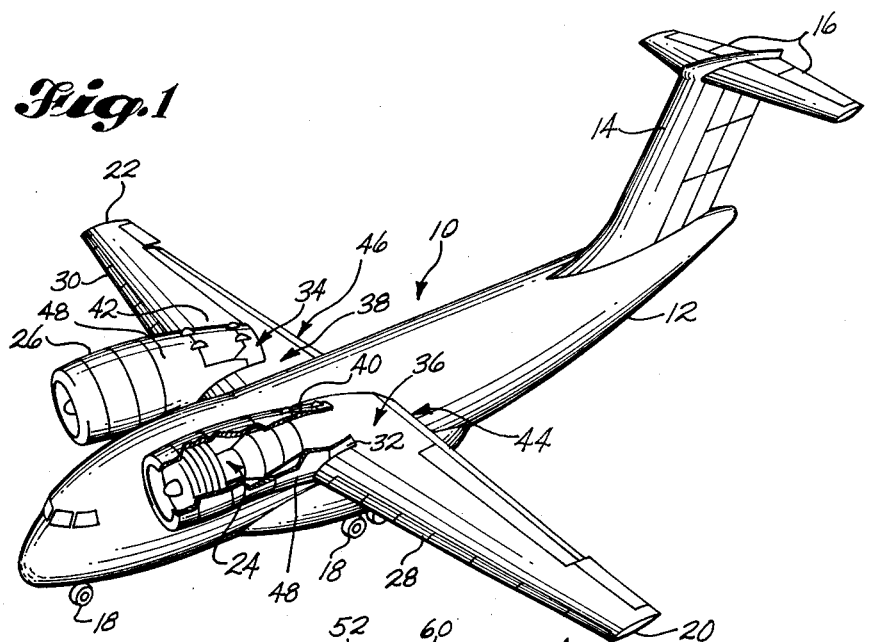

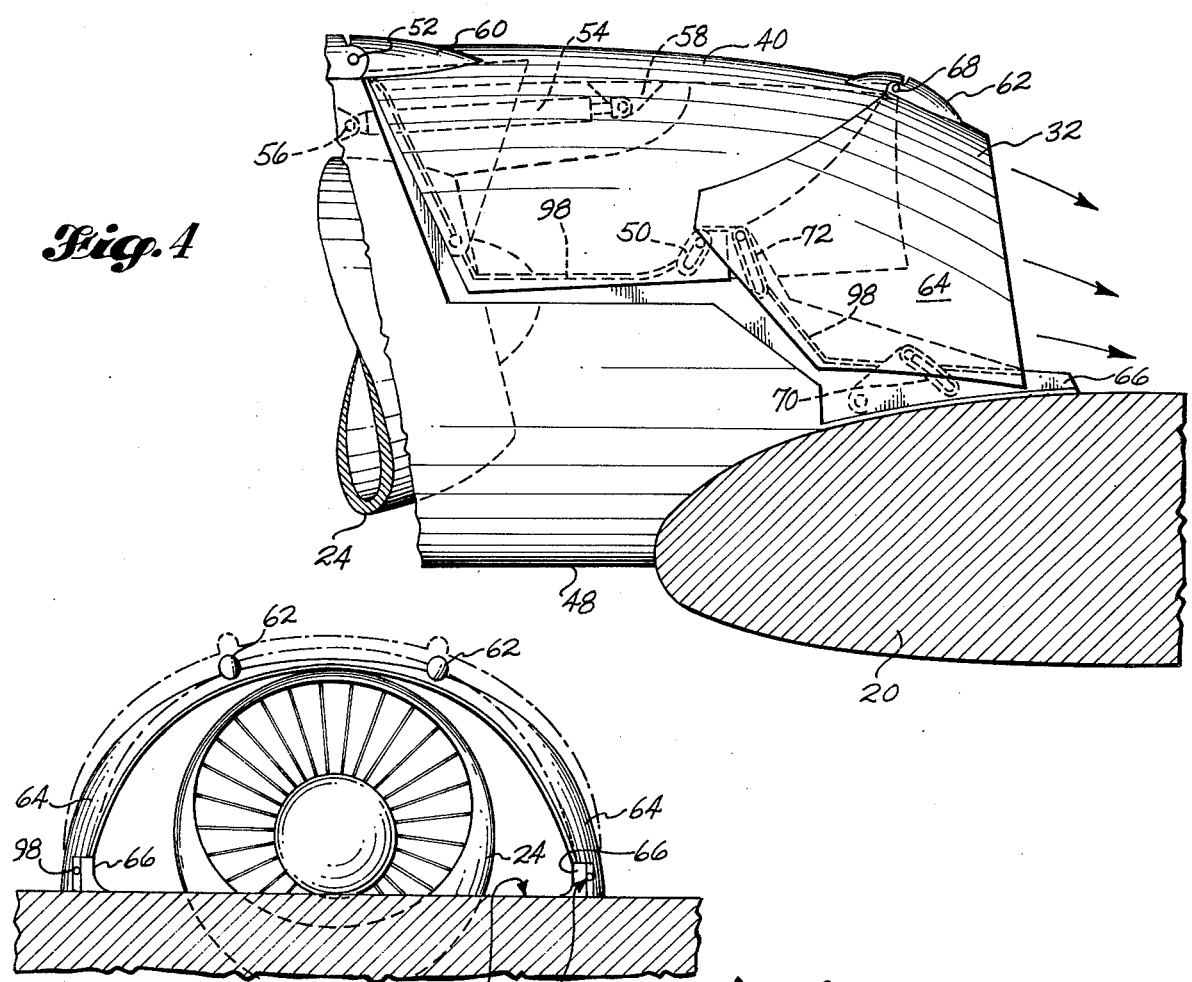

ARTICULATED NOZZLE FOR UPPER SURFACE BLOWN AIRCRAFT

BACKGROUND OF THE INVENTION

1. Field of the Invention

This disclosure relates in general to exhaust nozzles for upper surface blown aircraft and more particularly to an articulated dee nozzle for use in an upper surface blown aircraft which can vary its exit geometry.

2. Description of the Prior Art

Various types of short takeoff and landing (STOL) aircraft are in use. In general these aircraft include some means or form for augmenting or entirely replacing the aerodynamic lift of the wings during low speed operation occurring during takeoff and landing.

One type of aircraft that includes a method and apparatus for augmenting the aerodynamic lift created by its wings during low speed operation is an upper surface blown aircraft. An upper surface blown aircraft utilizes jet engines mounted so that the jet exhaust occurs above the wings rather than below the wings, as in conventional aircraft. The upper surface exhaust, during low speed operation, is "turned" downwardly over extended flaps located at the rear of the wing surface. The turning of the exhaust occurs without external mechanical means, in accordance with the well known Coanda effect. The downwardly directed exhaust provides the desired lift augmentation during low speed operation, particularly during takeoff and landing.

One of the problems with upper surface blowing aircraft relates to the cross-sectional configuration of the jet exhaust. A standard, relatively thick, jet exhaust will not follow the curve created by the extended flap. If the jet exhaust is vertically thick, it will separate from the wing and flap and not give the lift desired. A thick jet exhaust is characteristic of efficient cruise operation.

Conventional jet aircraft using under the wing engines obtain satisfactory performance during cruise and takeoff using a fixed exhaust nozzle geometry. Problems are encountered, however, in upper surface blown STOL aircraft using a Coanda flap system (a flap system that utilizes the Coanda effect) to obtain a powered lift that augments conventional aerodynamic lift. Effective Coanda flow turning can only occur if the thickness of the nozzle flow is limited to a certin percentage of the radius of curvature of the flap. If this limit is not met, the negative pressure naturally occurring on the wing upper surface side of the exhaust will be inadequate to turn the exhaust over the flap. Since flap size limits generally restrict the radius of flap curvature, the maximum exhaust flow thickness is correspondingly limited.

One way of attacking the above problem is to direct the exhaust flow downwardly, at a high angle relative to the horizontal plane by deflection or nozzle inclination. If a fixed nozzle exit area was sized for the STOL mode, the effective area of the nozzle would be too large at cruise resulting in engine nozzle mismatch and/or poor performance. Conversely, if the nozzle exit area is sized for cruise mode to overcome this disadvantage, the takeoff thrust would be below a tolerable level. A fixed high aspect ratio nozzle can be utilized to obtain the desired spreading, and resultant thinning, of the jet exhaust. However, this method results in cruise mode disadvantages. A wide nozzle, suitable for takeoff and landing has a reduced thrust efficiency, a high cruise drag and high weight. These disadvantages result in increased fuel consumption, and an equivalent loss in range.

SUMMARY OF THE INVENTION

In accordance with the invention an exhaust nozzle for use with an upper surface blown aircraft is provided. The aircraft has an engine for developing thrust by discharge of exhaust gases through an exhaust outlet. The engine is mounted on and operatively associated with the wing of the aircraft and the exhaust outlet so oriented to the wing to discharge the exhaust gases across the upper airfoil surface of the wing when the engine is in operation.

The exhaust nozzle provided by the invention is positioned to receive and guide the mixed gases from the engine fan and primary air flow. The exhaust nozzle has a lower portion and an upper portion each connected to the engine nacelle. The nozzle is constructed for movement from a first position directing the exhaust gases rearwardly when the aircraft is operating in cruise mode, to a second position for takeoff and landing wherein the upper portion of the exhaust nozzle is moved upward relative to the bottom portion of the nozzle and tilted downward relative to the first position. The effect of this second position is to increase the nozzle exit area, and direct the exhaust gases rearwardly and downwardly causing lateral spreading of the exhaust gases across the wing. Actuating means are coupled to the exhaust nozzle for effecting the movement of the upper portion of the nozzle from the first to the second position.

It is the object of the invention, therefore, to provide an exhaust nozzle for use in an upper surface blown aircraft which will reduce drag due to jet scrubbing of the upper wing surface during cruise operation. Drag is also reduced in the invention during cruise by reducing the wetted area of jet flow in the exhaust nozzle; by reducing the angle of nacelle boat tail; and reducing the angle of jet kick-down.

Another object of my invention is to provide an exhaust nozzle in an upper surface blown aircraft which improves thrust efficiency and maintains STOL powered lift efficiencies without changing the over-all weight of the engine assembly.

A further object of my invention is to provide a variable geometry exhaust nozzle in an upper surface blown aircraft which maximizes the efficiency of both the cruise mode and STOL mode of operation.

A still further object of my invention is to provide an exhaust nozzle in an upper surface blown aircraft which regulates the thickness of the exhaust stream, thus keeping Coanda attachment to the flap surfaces at high flap angles, and spread the jet stream over a wide flap surface area producing high lift for the aircraft during STOL operation. Lift is also increased in the invention by increasing jet kick-down angle during STOL.

BRIEF DESCRIPTION OF THE DRAWINGS

FIG. 1 is an isometric view of an upper surface blown aircraft used for STOL application.

FIG. 2 is a side elevation view of the apparatus of the invention showing the exhaust nozzle during cruise mode operation.

FIG. 3 is an isometric view of the aft portion of the left engine of an upper surface blown aircraft showing the exhaust nozzle of the invention.

FIG. 4 is a side elevation view of the apparatus of the invention showing the upper exhaust nozzle and thrust reverser door position during STOL operation.

FIG. 5 is a side elevation view of the apparatus of the invention showing the position of the upper exhaust nozzle and thrust reverser door during thrust reversing operation.

FIG. 6 is a rear view of the engine and exhaust nozzle in accordance with the invention showing the nozzle in the STOL (raised) and cruise (lowered) positions.

DESCRIPTION OF THE PREFERRED EMBODIMENT

Figure 7A:
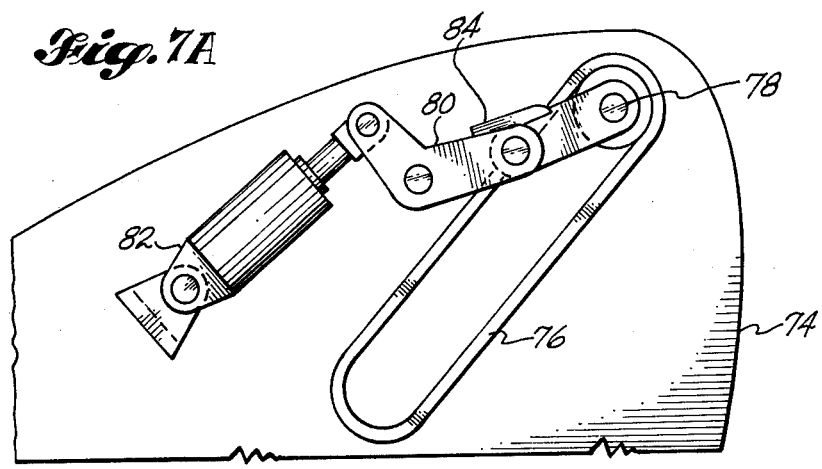
FIG. 7A is a detailed side elevation view of the guide member and locking means shown in FIGS. 4, and 5 showing the pin locked in the uppermost position in the slot during STOL and T/R modes.
Figure 7B:
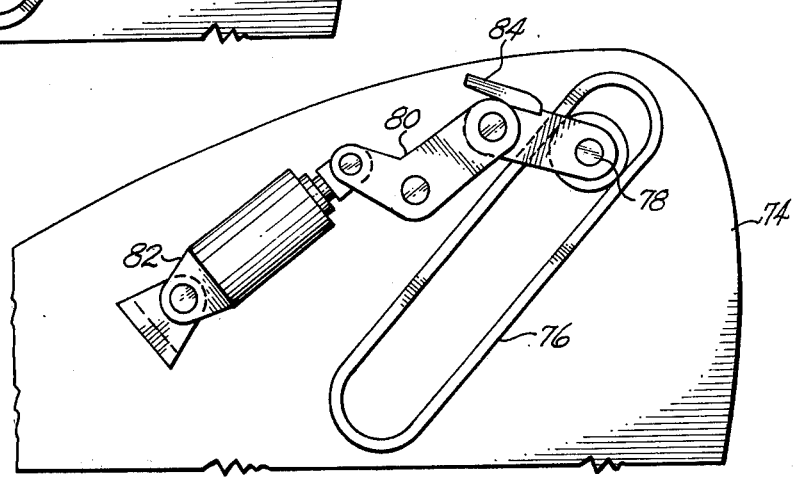
FIG. 7B is a detailed view of the guide member and locking means similar to Fig. 7A showing the pin unlocked.
Figure 7C:
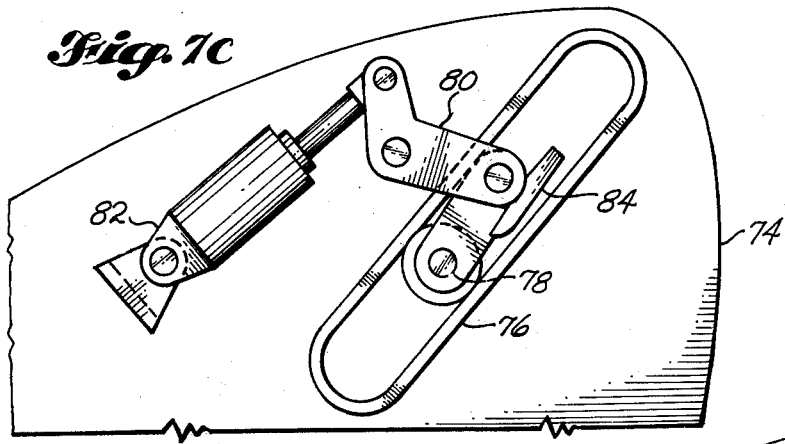
FIG. 7C is a detailed view of the guide member and locking means similar to FIG. 7A and 7B showing the pin travelling within the slot.

Referring to FIG. 1, a short takeoff and landing (STOL) aircraft 10 includes a body 12, a vertical stabilizer 14 and horizontal stabilizers 16. Suitable landing gears 18 support the body 12 of the aircraft on the ground. High mounted left and right wings, 20 and 22 respectively, are connected in a conventional manner to the body 12. Left and right engines, 24 and 26 respectively, are mounted inboard on the respective wings at positions very close to the body 12 to improve the engine performance characteristics of the aircraft. The engines 24 and 26 are cantilevered on struts (not shown) so that the major portion of each of the engines is located above and forwardly of the respective leading edges 28 and 30 of the wings. The exhaust nozzles 32 and 34 of the engines open onto the respective upper airfoil surfaces 36 and 38 so that the exhaust streams from the engine are discharged chordwise across the wings. Thrust reverser doors 40 and 42 are provided for reversing the engine thrust to assist in braking the aircraft on landing.

The engines 24 and 26 are located with respect to the wings 20 and 22 to take advantage of lift augmentation through upper surface blowing. In a cruise mode of operation the exhaust streams are discharged rearwardly from the engines in a longitudinal direction with respect to the engine to provide forward thrust. In the STOL mode of operation, the upper surface blowing trailing edge flaps 44 and 46, which are mounted on the wings 20 and 22 rearwardly of the engine, are extended to form a smooth rearward and downward curve from the aft portion of the wings. The exhaust gas streams adhere to the surfaces of the flaps by the Coanda effect and are turned in a downward and rearward direction following the surface of the flaps. Aerodynamic lift is thus augmented during landing and takeoff since the thrust vector acting on the aircraft has both an upward and forward component. Also in the STOL mode of operation, super-circulation, the aerodynamic lift increasing effect of distortion of airflow over the airfoil caused by an exhaust stream exiting downwardly and rearwardly from the trailing edge of the aft portion of the flaps, supplements conventional aerodynamic lift.

Referring now to FIG. 2, one thrust reverser door 40 and exhaust nozzle 32 are shown in detail. The apparatus of the invention will be described for one engine and wing for purposes of clarity and illustration. The engine 24 is surrounded by a nacelle 48 forming the strut and fairing around the engine. The inner wall of the nacelle 48 is spaced from the engine 24. The thrust reverser door 40 and exhaust nozzle 32 form a rearward extension of the nacelle serving to guide the exhaust gases from the engine rearwardly. Thrust reverser door 40 is of a blocker type with its lower part always pivoted to the nacelle 48 by mounting means 50. The upper forward part of the reverser door 40 is connected to the nacelle 48 by detachable forward hinge means 52 during the cruise and STOL modes.

A single center actuator 54, for actuating the thrust reverser door, is mounted by mounting means 56 and 58 to the nacelle 48 and reverser door 40, respectively. The actuator 54 is connected to a suitable power source (not shown) located within the aircraft 10. Fairings 60 are located on the top of the reverser door 40 to cover the detachable forward hinge means 52.

The exhaust nozzle 32 has an upper portion 64 and lower portion 66. The upper portion 64 is hinged to the aft part of the reverser door 40 by detachable aft hinge means 68. Fairings 62 are used to cover the detachable aft hinge means 68. The lower portion 66 is mounted to the nacelle 48 of the aircraft by suitable mounting means (not shown). The upper portion 64 of the exhaust nozzle is mounted by mounting means 72 to the nacelle 48 and connected by connecting means 70 to the lower portion 66 of the exhaust nozzle.

Figure 7D:
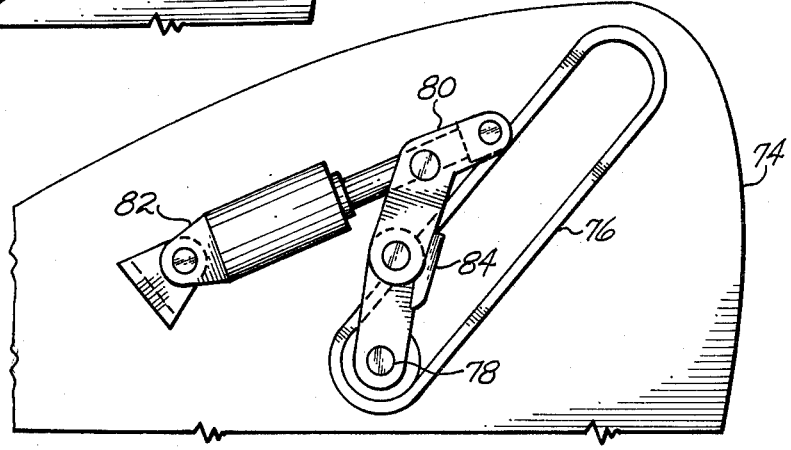
FIG. 7D is a detailed view of the guide member and locking means showing the pin locked in its lowermost position.

Referring to FIGS. 7A through 7D, a schematic of the outboard mounting means 50 is shown. A pivot member 74 with a slot 76 serving as a pin track holds pin 78. Pin 78 is locked in position by an over centering link 80 and extended actuator 82. A link stop 84 is part of link 80. Actuator 82 is connected to link 80 so that upon retraction of the actuator 80, the pin 78 is unlocked and free to move within slot 76. When the pin 78 travels to its lowermost position in slot 76 as shown in FIG. 7D, the actuator 82 is extended to over center link 80 and lock pin 78 in place. Mounting means 50 and 72 are interlinked (not shown) and actuator 82 locks or unlocks both mounting means. Mounting means 72 and connecting means 70 have a similar guide member 74, pin 78 and slot 76, but connecting means 70 has no locking means.

Figure 8A:
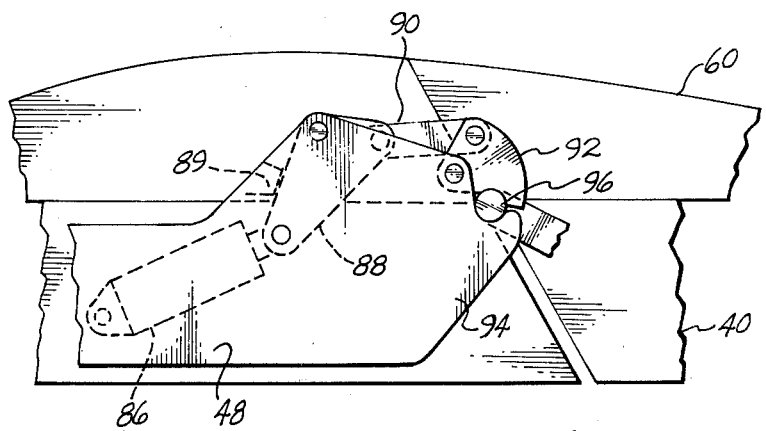
FIG. 8A is a detailed view of the forward upper hinging means showing the hinge in the down and locked position.
Figure 8B:
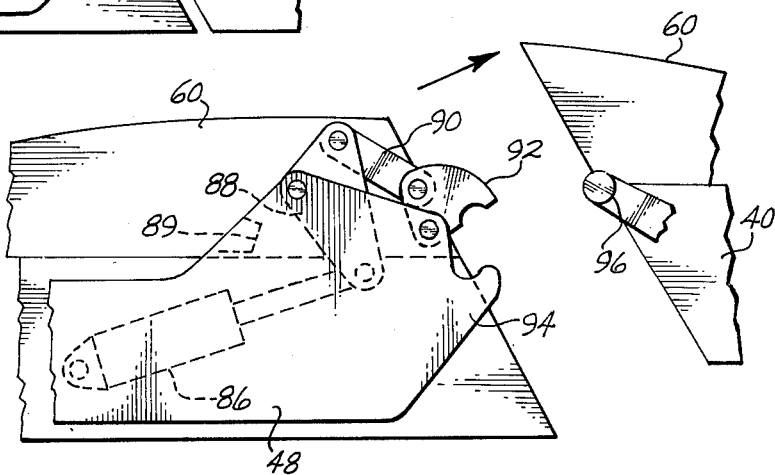
FIG. 8B is a detailed view of the forward upper hinging means showing the hinge in the released position.

Now referring to FIGS. 8A and 8B, the upper forward hinging means 52 is shown in detail. An actuator 86 is connected to over centering locking link 88 which in turn is connected to link 90. A stop 89 for link 88 is provided. Link 90 is connected to pin holding means 92. Pin holding means 92 together with guide member 94 form a channel which holds the hinge pin 96. Hinge pin 96 is mounted to the thrust reverser door 40. To effect a release of pin 96 from pin holding means 92 ang guide member 94, actuator 86 is extended. Link 88 is rotated counterclockwise, and link 90 is moved upward forcing holding means to rotate releasing pin 96.

Figure 9A:
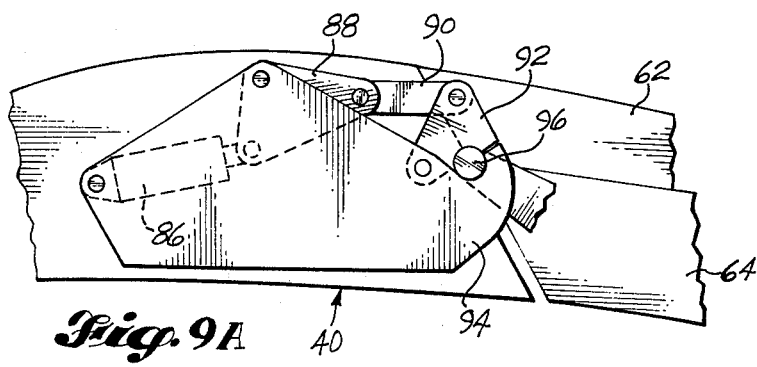
FIG. 9A is a detailed view of the aft upper hinging means showing the hinge in a down and locked position.
Figure 9B:
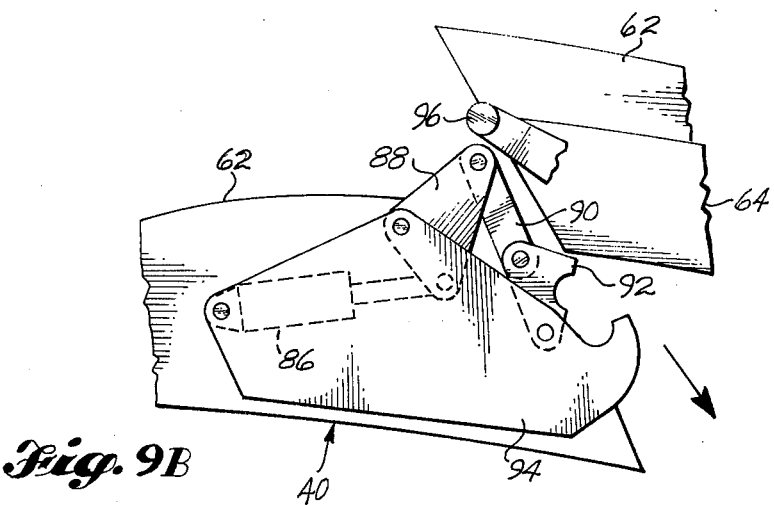
FIG. 9B is a detailed view of the aft upper hinging means showing the hinge in a released position.

The aft hinge means 68 as shown in FIGS. 9A and 9B has a similar structure. The travel of the hinge means 68 is different than hinge means 52. The rear part of the thrust reverser door containing the hinge assembly except for pin 96 moves downward when the pin 96 is released from pin holding means 92 and guide member 94 as shown in FIG. 9B.

In normal cruise operation, the exhaust stream is directed rearwardly through the exhaust nozzle. The exhaust nozzle 32 and reverser door 40 are positioned as shown in FIG. 2. The exhaust nozzle receives the exhaust of engine 24 and guides it rearwardly over the upper airfoil surface 36 of the aircraft. During cruise operation, drag due to the exhaust stream "scrubbing" the wing of the aircraft is undesirable. Ideally the exhaust stream contacting the upper airfoil surface of the wing should be as narrow as possible to eliminate scrubbing and drag. The outlet area of the exhaust nozzle 32 is desirably less during the cruise mode than during STOL operation. The outlet area must be properly sized for a given engine to avoid engine malfunction and inefficiency. The increase in outlet area desired for STOL is accomplished in the invention without compromising engine efficiency during cruise mode, since the exhaust nozzle 32 can assume an elevated position with a larger outlet area during STOL.

At the onset of STOL, FIG. 7D actuator 82 associated with mounting means 50 and 72 is actuated to unlock the over centering link 80. Pin 78, therefore, is free to slide upward within slot 76 of guide member 74 of mounting means 50 and 72. The upper portion 64 of the exhaust nozzle can now be moved to a second position for STOL. This movement is now accomplished by a slight extension of actuator 54. Thrust reverser door 40 and the upper portion of the exhaust nozzle 64 are articulated. The exact movement is determined by the pins 78 moving through the slots 76 within guide members 74 of mounting and connecting means 50, 70, and 72. The reverser door 40 and upper nozzle portion 64 remain hinged by hinge means 68 and 52 during STOL. When the pins 78 are in their uppermost positions within slots 76, actuator 82 is again extended and the pins 78 in connecting means 50 and 72 are locked in a stable new position.

Referring to FIGS. 4 and 6, in the second position, the upper portion 64 of the exhaust nozzle is moved upward from the lower portion 66, increasing the outlet area of the nozzle 32. The upper portion 64 is also tilted downward relative to its cruise mode position. The exhaust stream is directed downwardly and rearwardly. This new position for STOL operation increases the lift from the Coanda effect because of the lateral spreading of the exhaust stream over the wing and flaps. Special vortex generators (not shown), located within the upper nozzle 64 or forward of the flap knee may be used to further increase the horizontal spread of the exhaust stream over the wing and flap and improve boundary layer control.

The upper portion 64 of the exhaust nozzle and the reverser door can be returned to cruise position by first retracting the actuator 82 thereby unlocking pin 78 and then retracting actuator 54 thereby pulling the upper nozzle 64 and reverser door 40 back down to their first positions. The pins 78 of mounting means 50 and 72 now in their lowermost position can be locked by extending actuator 82 to over center links 80.

Referring to FIG. 5, operation of the aircraft in the thrust reverser mode is shown. Reverser door 40 is detached from the upper exhaust nozzle 64 through detachment hinge means 68 and the nacelle through detachment hinge means 52. Actuator 54 is extended to produce a rotation of door 40 to the thrust reverser position in a conventional manner. This movement of the door 40 is accomplished with the pins 78 of mounting and connecting means 50, 70, 72 in their uppermost (STOL) positions. The exhaust stream is deflected forwardly, as shown, to assist in braking of the aircraft. The nozzle assembly of the invention will not interfere with operation in the thrust reverser mode when in the second position (STOL). The first position (cruise mode) of the nozzle will not permit the thrust reverser door to deploy thereby improving the safety of the aircraft during cruise. The thrust reverser door is interlocked from accidental deployment during cruise by the four locking actuators in mounting systems 52, 68, 50 and 72.

Referring to FIGS. 2, 4 and 6, sealing is provided between the reverser door 40 and upper portion 64 and the lower portion 66 of the exhaust nozzle with inflatable expanding bladder seals 98. The seals 98 fit between the interface of the upper 64 and lower portions of the exhaust nozzle 66 and thrust reverser door 40 and nacelle 48 and are inflated after positioning into the STOL and cruise modes. The use of inflatable seals 98 will improve thrust performance by reducing leakage, and increase seal lifetime by eliminating the wear a standard sliding seal would experience. The seal 98 design and operation would be in the manner conventional to present fighter plane canopies.

What is claimed is:

1. In an upper surface blown aircraft having an engine surrounded by a nacelle, the engine developing thrust by discharge of exhaust gases through an exhaust outlet and being mounted on and operationally associated with the wing of the aircraft, the exhaust outlet being so oriented to the wing so as to discharge the exhaust gases across the upper airfoil surface of the wing when the engine is in operation, the combination comprising,
   a. an exhaust nozzle mounted to the nacelle positioned to receive the guide the exhaust gases from the outlet of the engine, said exhaust nozzle having an upper and lower portion;
   b. a thrust reverser door;
   c. first mounting means for mounting the upper portion of said exhaust nozzle to the nacelle;
   d. second mounting means for mounting the thrust reverser door to the nacelle;
   e. hinge means for connecting the aft portion of said reverser door to the upper portion of said exhaust nozzle;
   f. connecting means for connecting the upper portion of said exhaust nozzle to the lower portion of said exhaust nozzle; and
   g. actuating means connected to said reverser door and said exhaust nozzle for effecting a movement of said reverser door and the upper portion of said exhaust nozzle from a first position directing the exhaust gases rearwardly when the aircraft is in cruise mode, to a second position for use in takeoff and landing wherein the upper portion of said exhaust nozzle is moved upward relative to the lower portion thereby increasing the outlet area of said exhaust nozzle, and wherein the upper portion of said exhaust nozzle and said reverser door are tilted relative to the first position thereby directing the exhaust gases rearwardly and downwardly and causing lateral spreading of the exhaust gases across the wing.

2. The combination of claim 1 wherein:
a. said connecting means includes first pin means, and a first guide member mounted to the lower portion of said exhaust nozzle and having a slot therein adapted to receive said first pin means whereby the upper and lower portions of said exhaust nozzle are connected through said first pin means and said first guide member;
b. said first and second mounting means includes second pin means, a second guide member mounted to the nacelle and having a slot therein adapted to receive said second pin means whereby the upper portion of said exhaust nozzle is mounted to the nacelle through said second pin means and said second guide member, and locking means for locking said second pin means in a fixed position in the slot; and
c. said actuating means includes a power source located in the aircraft, a first actuator connected to said power source and cooperating with said locking means so that actuation of said first actuator causes said locking means to unlock said second pin means, and a second actuator connected to said power source and cooperating with said reverser door and the upper portion of said exhaust nozzle whereby actuation of said second actuator causes a movement of said reverser door and the upper portion of said exhaust nozzle from the first position to the second position when said locking means is unlocked.

* * * * *